United States Patent [19]

McQueen

[11] 4,449,403

[45] May 22, 1984

[54] GUIDE TUBE INSERTED LIQUID LEVEL SENSOR

[76] Inventor: Malcolm M. McQueen, 1755 La Costa Meadows Dr., San Marcos, Calif. 92069

[21] Appl. No.: 278,336

[22] Filed: Jun. 29, 1981

[51] Int. Cl.³ ............................................. G01F 23/22
[52] U.S. Cl. ...................................... 73/295; 73/292; 376/247; 376/258; 374/142; 374/148
[58] Field of Search .......... 73/204, 295, 292, 432 SD, 73/432 J; 374/166, 142, 183, 185, 114, 148; 340/622, 247, 258

[56] References Cited

U.S. PATENT DOCUMENTS

| | | | |
|---|---|---|---|
| 3,111,031 | 11/1963 | Kuritza | 374/114 X |
| 3,653,262 | 4/1972 | Ehrenfried et al. | 374/142 |
| 3,727,460 | 4/1973 | Francioni | 324/148 |
| 3,898,638 | 8/1975 | Deane et al. | 340/599 |
| 4,362,403 | 12/1982 | Mooney | 73/295 X |
| 4,393,025 | 7/1983 | Leyse | 376/247 |
| 4,398,169 | 8/1983 | Hayashi | 374/185 X |

FOREIGN PATENT DOCUMENTS

| | | | |
|---|---|---|---|
| 723389 | 12/1965 | Canada | 73/295 |
| 2728582 | 1/1978 | Fed. Rep. of Germany | 73/295 |

OTHER PUBLICATIONS

Davidson et al., "Sodium Electrotechnology at the Risley Nuclear Power Development Laboratories," Nucl. Energy, 2/81, vol. 20, No. 1, pp. 79-90.

Primary Examiner—Gerald Goldberg
Assistant Examiner—Tom Noland
Attorney, Agent, or Firm—Sanford Astor

[57] ABSTRACT

This invention relates to a system for sensing the liquid level and coolant properties in a fluid containing vessel by insertion into the vessel of a plurality of matched spaced sensor probes comprising a first and second temperature sensor, the first sensor essentially measuring the media temperature, a heater, an arrangement for applying differential heat between the sensors, the heater and second sensors being thermally connected, all positioned to permit the sensing at the cooling quality of the media present, the heater located directly adjacent the second sensor and adjusted so that when the cooling quality of the normal fluid is sensed the heat generated by the heater and passing into the fluid is virtually completely dissipated and only a small finite differential temperature exists between the sensors and thereby indicates a sub-cooled liquid is present. When fluid is absent and vapor is present a higher and distinguishable differential temperature will exist and the value of the temperature differential is related to the absence of fluid and the cooling properties of the vapor phase that is present is being sensed. In the presence of saturated or boiling liquid there will be virtually no differential temperature and the small differential temperature present in sub-cooled liquid disappears as saturation is approached.

7 Claims, 4 Drawing Figures

GUIDE TUBE INSERTED LIQUID LEVEL SENSOR

BACKGROUND OF THE INVENTION

During the accident of the Three Mile Island nuclear power plant, a condition of low coolant level in the reactor vessel and, as a result, inadequate core cooling existed and was not recognized for a long period of time.

It was immediately recognized that improved instrumentation systems, including reactor vessel liquid level sensors, must be developed and inserted into all light water reactors. The problem was to find a reliable and accurate sensor and a method to insert this sensor into existing reactors as well as building the sensor into new reactors.

A differential pressure system for detecting level in the reactor vessel had been attempted but was found to be unreliable and inaccurate.

A second employed method was to place level sensors in the reactor pressurizer (connected to the pressurized reactor vessel) and infer somewhat ambiguously that the reactor vessel had a solid pack of coolant. This was the method used at Three Mile Island. The pressurizer is a second vessel connected to the reactor vessel and is close to and above the reactor. Because of a temperature differential reversal, the pressurizer was full of water and the reactor vessel had a large steam bubble trapped in it. Because the pressurizer instruments reported a full condition the operator turned off emergency pumps that were installed to keep the reactor full of coolant. This ultimately led to the problem that occurred because while the reactor was dry, high temperature failures occurred in the fuel rods.

A third method suggested comprises heated thermocouples but these read only a wet/dry condition in the reactor vessel above the fuel rod assemblies, and do not detect or read coolant temperature. Moreover, because of inaccuracies inherent in thermocouples, it is necessary to apply excessive amounts of heat in order to assure a positive differential temperature under all reactor conditions. When the sensor is "dry", the excessive heat, if not otherwise controlled, will melt the heater to failure and indicate that the sensor is "wet" when in fact it is "dry" and the heater has failed.

OBJECTS OF THE INVENTION

It is an object of the present invention to provide a sensing system to accurately determine the wet/dry and/or cooling properties and condition in a fluid containing vessel.

It is a further object of the invention to provide a sensing system to accurately determine the wet/dry and/or cooling condition in a nuclear reactor vessel in and above the fuel rod bundles.

A further object of the invention is to array a plurality of sensors in a single string of sensors so that a plurality of points can be detected in the reactor vessel with a minimum number of guide tubes being employed.

Still another object of the invention is to provide coolant temperature readings at various points in the reactor vessel.

Still another object of the invention is to provide a method to insert a string of a plurality of sensors into existing reactor vessel instrument guide tubes.

Still a further object of the invention is to provide a string of sensors which provide for passage of liquid inside the instrument guide tubes so that the inside of the tubes reflect the liquid level that exists outside the tubes and/or in fact does not depart from the present thermo-hydraulic properties of the guide tubes as presently constituted.

Still a further objective is to compare the actual differential temperature on a steady state and/or a transient basis to determine the cooling qualities of the gaseous media.

Still another objective is to simulate the thermal dynamic properties of the fuel rods and thereby determine the transient fuel rod temperature.

The advantages of this invention over the other methods described are it accurately determines the wet/dry condition of the coolant in the region of the fuel rods, it provides for multipoint sensing at a plurality of points within the same instrument guide tube, and it provides, as will be described, an independent transient temperature reading of the coolant and simulated steady state or transient maximum fuel rod temperature and can be programmed to simulate actual temperatures instead of maximum. Because of its distributed location and analog output of media versus fuel rod temperature on a transient basis, it is able to report the results of an accident mitigating or curative action on a real time basis.

DESCRIPTION OF THE INVENTION

These, and other objects and advantages of the invention will be obvious from the following description of the drawings in which FIG. 1 is a cut away assembly view partially broken away of the device of the present invention located in an instrument guide tube;

Figure 1:
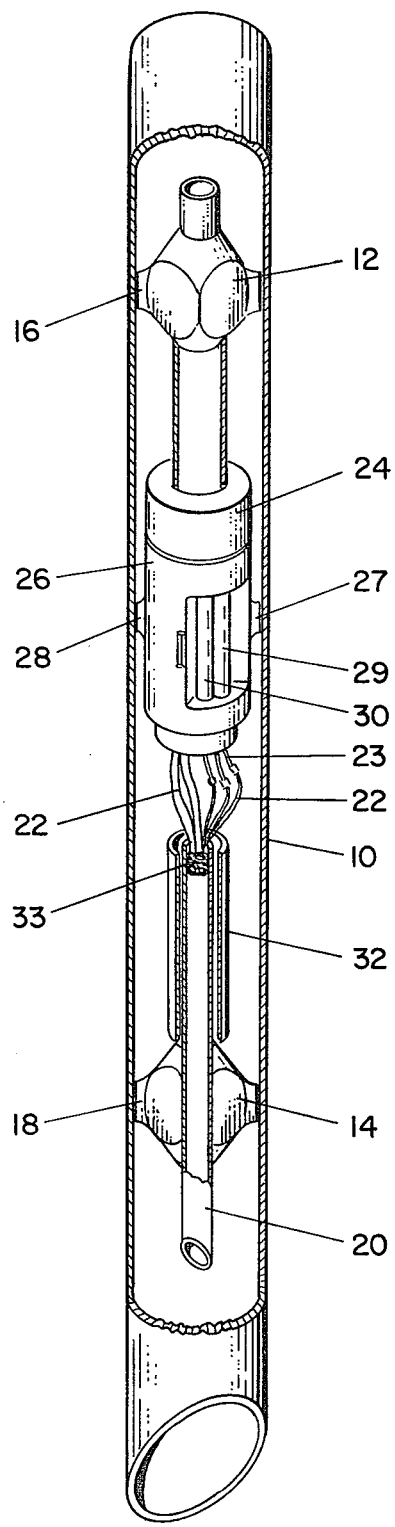

Referring now to FIG. 1, there is shown an instrument guide tube 10 which is located inside a nuclear reactor vessel. There are only a few of these guide tubes available in the reactor vessel of reactors presently in existence. The guide tube 10 acts as a shroud to prevent splashing and boiling coolant from affecting the instrument response.

Inside of the guide tube 10 is an optional connector 12 and a second optional connector 14 which indicate a method of holding the array of sensors in the center of the guide tube 10. The connectors 12 and 14 contain guides 16 and 18 which aid to insert the unit into the guide tube 10. The guides 16 and 18 may be cusped or hollowed out in a concave manner to allow coolant to pass past the connectors and through the guide tube 10. Optionally, the centering and guiding can be done by shaping the body of the sensor for this purpose.

Attached to connectors 12 and 14 is a wiring tube 20 which runs between adjacent sensors. The tube 20 contains the electrical leads 22 for each of the sensor elements in the string.

Figure 2:
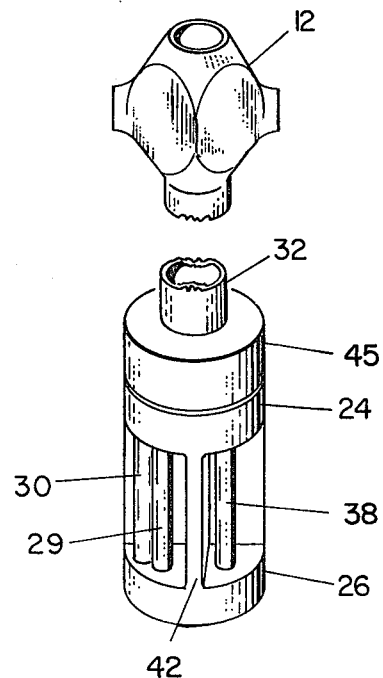
FIG. 2 is a detail view of the sensor of the invention.

The sensor element 24 is located in the guide tube 10, shown in more detail in FIG. 2, and comprises a casing 26, optional guides 27 and 28, and as shown, one of the two resistance temperature detectors 29 and the heater element 30. The sensor elements utilized in this invention are described in detail in U.S. Pat. No. 3,366,942, and my U.S. Pat. No. 3,898,638. Basically, the sensor employs a pair of heat sensing probes along with a heater probe thermally connected therewith. Each sensing probe includes a hollow closed casing with a sensing wire disposed in the casing and connected to a constant current source, and to means for detecting a temperature differential between the probes, as indicated by a difference in the electrical resistance of the probe wires. The sensor probes and heater probes are introduced into a conduit through which matter may flow, in this case the guide tube 10. In the absence of fluid, the sensing probes are at different temperatures because of the location of the heater element 30 to the one probe 29. However, when any type of matter, such as coolant, is present and/or flows past the probes, heat is carried away and the temperature difference between the two sensing probes disappears. An accurate measure of the temperature difference and its rate of change depicts the situation in the guide tube 10 with respect to the coolant present and its rate of flow.

Referring to FIG. 1, a telescoping connecting tube 32 connects the series of sensor elements together. Wiring 22 passes through connecting tube 32 and body 26 to continue to upper sensor elements. Wires 23 leading from the sensor 24 are connected to some of the wires 22 while the remaining wires of 22 pass through the sensor body 26 to the next sensor. An optional plug of ceramic 33 holds and protects the wires 22.

Figure 3:
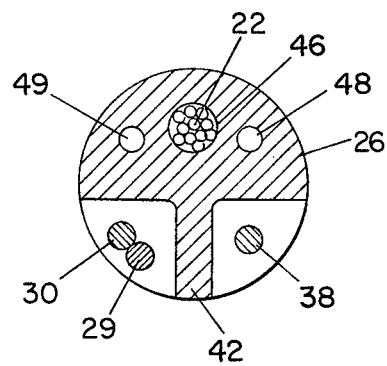
FIG. 3 is a cross-section view of the sensor.

Referring now to FIG. 2 and FIG. 3, there is shown a sensor 24 in more detail. The sensor 24 comprises the casing 26, one resistance temperature detector 38, called the unheated or reference temperature sensor and the second resistance temperature detector 29, and the heater element 30. A stiffener 42 is placed between the two detectors 38 and 29 to give the sensor more strength and thermal insolation of detector 38 from the heater 30. The connecting tube 32 passes from the sensor to the connector or centering guide 12 to connect to the next adjacent sensor.

The stiffener 42 acts to add strength to the sensor and also to prevent any bending of the sensor during insertion of the string of sensors as later described. The stiffener is optional but adds strength and thermal isolation of the two sensors when needed, to the sensor body.

A cap 45 covers the top of sensor body 26 and is welded down after all wires have been connected.

FIG. 3 shows the wiring hole 46 through the sensor body 26 to allow the passage of the electrical wires 22. Potting holes 48 and 49 are placed in the body 26. When all wires have been connected, a liquid ceramic is injected into one of the potting holes 48 until it comes out of the other potting hole 49 to completely fill the spaces surrounding the wires 22 and give a solidly held package of wiring to prevent any damage.

Figure 4:
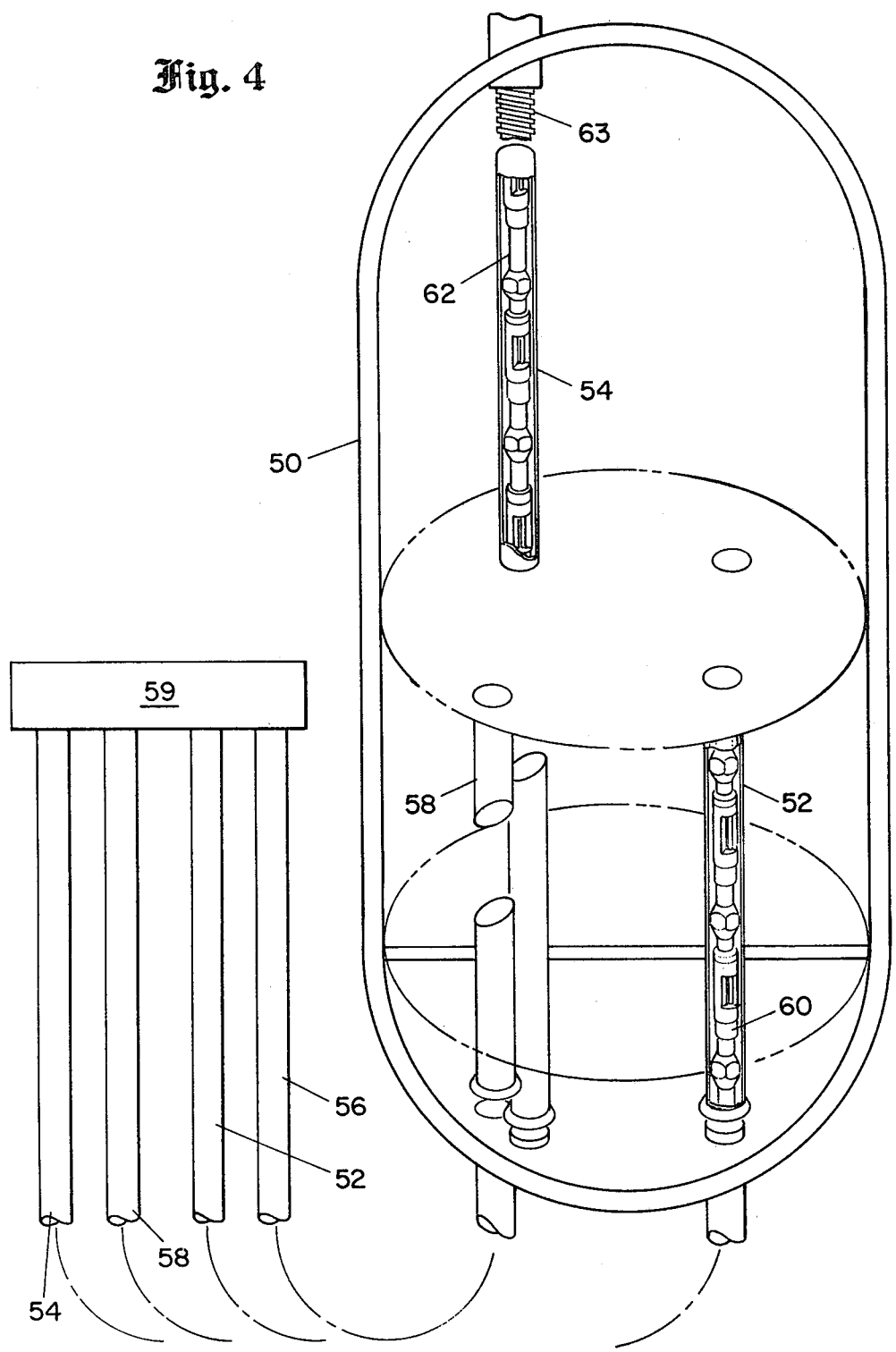
FIG. 4 is a diagrammatic view of a nuclear reactor vessel containing a string of sensors, in the region as well as above the reactor fuel core region.

Referring now to FIG. 4, there is shown the nuclear reactor vessel 50. The reactor vessel comprises the fuel rods and control rods which are not shown, and four of the numerous instrument guide tubes 52, 54, 56 and 58. The instrument guide tubes exit from the reactor vessel 50 in a manner where the guide tubes curve away from the reactor to the seal table 59.

Inside of the instrument guide tubes 52 and 54 are shown strings of sensors 60 and 62. They will not be described in any more detail since they have been described in FIGS. 1, 2 and 3. Additional sensors may be mounted from above from the control rods as shown at 62 and 63 respectively which is the second embodiment or configuration of the sensor elements. A shroud 54 may be located around the sensors to prevent splashing and boiling liquid from erroneously showing a "wet" condition when in fact only partial wetting is occurring. The shroud also isolates the sensor assembly from flowing media. The major problems encountered in creating the string of sensors and inserting them into the instrument guide tubes are minaturization of the sensors themselves, a method of connecting the sensors together, which method had to include a means to insert the string into the guide tube around the curve that exists, without damage to the sensors or the connecting means. The string also had to contain a way to allow fluid passage around the sensors and connecting means in the instrument guide tube. This was accomplished by utilizing the semi-flexible connecting tube 32 which was capable of bending around the insertion curve without damage and then straighten out when it reached the straight portion of the instrument guide tube in the reactor. In addition the connectors 12, 14, and 44 were designed to help guide the string through the tube while providing a cusp or concave surface to allow passage of coolant and to keep the sensors centrally disposed within the guide tube.

An important feature of the invention is that it can warn the operator before a void is formed in the vessel; and in the first preferred configuration, it can advise the operator as to the momentary conditions of the fuel rods during and after the void formation. There are 3 regimes in which it is important for the device to sense the coolant properties: Subcooled; (the normal operating condition) saturated liquid (the boiling condition) and saturated vapor (a voided condition).

Voids are dangerous in the reactor vessel in that an inadequate cooling of the nuclear fuel rods can occur if a steam void is present in the region of the fuel rods. This first embodiment or configuration is one of the two most important uses of the subject device; and in this use, the instrument would be made to simulate the thermal properties of the fuel rods.

Also, if a void is present in a vessel and the pressure is raised by a few pounds per square inch by means of a pump or by opening a valve that allows the pressure to rise, an event called a "water hammer" occurs wherein destructive pressure waves are formed by the collapse of the void bubble; these pressure waves can be several hundred pounds per square inch in magnitude, and will occur if the void is rapidly collapsed. This is the second configuration as shown at the top of FIG. 4 in which the sensor assemblies are located above the core and is an important use of the instrument in that it can be configured without regard to the thermal properties of the fuel rods, but can be optimized with simple thermal properties to anticipate the possible void formation.

The pressure pulses from water hammers can break pipes, pipe supports, tanks, valves, pump casing seals and other vital equipment.

When the sensor assembly is being wetted by subcooled still water, the heated sensor 29 will typically maintain a differential temperature of preferably 5° F. above the temperature of the reference temperature sensor in the first embodiment. The 5° F. temperature can be optionally determined by adjusting the heater power to increase this value, but will ordinarily be optimum at 10° F. in the second embodiment if fuel rod properties, as discussed above, are minimized and the instrument is being used as an optimized pre-void warning device solely to control voiding and water hammers, as in the upper portion of FIG. 4, as shown in items, 54, 62 and 63.

As the saturation temperature (boiling point) of the fluid is approached, the differential temperature begins to diminish towards zero, thereby signaling that a void will form if further increases in the media temperature or a reduction of the pressure in the media is allowed to occur. In this configuration, forced convection cooling of the heated sensor must be prevented and this is accomplished by the shroud 54.

Once the void has occurred, a gross change in the differential temperature will occur of at least 15° F., and this can be used to signal that the void has formed and that caution should be used in slowly collapsing the void so that water hammers will not occur but not so slowly that melting of fuel rods because of loss of coolant on the rods will occur if the first embodiment is being used.

The loss of temperature differential will occur at the boiling point because no matter how much power is dissipated in the heater, the heater temperature, and thereby the heated temperature sensor, cannot exceed the temperature of the boiling fluid, which temperature is also being experienced by the reference temperature sensor. It is obvious that no matter how much heat is applied to water boiling in a kettle, the water temperature cannot exceed 212° F. at standard atmospheric pressure conditions. Higher heat flux does not change the temperature, but only the rate of boiling. The immersion of a sensor element in such a medium would result in both temperature sensors reading 212° F. (no differential) and a slight amount of local increased boiling at the heater.

Naturally, if the water temperature was 207° F., the heated sensor in the second embodiment would indicate 212° F. and the reference sensor would indicated 207° F. In this simplified example, the previous adjusted 10° F. differential temperature has been reduced to only 5° F. because the boiling point is being approached.

Naturally, as the medium temperature continues to increase, the 5° F. differential referred to above will continue to diminish, and will finally approach zero at the boiling point of the fluid.

With respect to the information obtainable by the sensor units, the thermal mass of the heated sensor, the thermal dispersion rate of heat transfer away from the sensor and the unit area heat generated by the heater can be adjusted to be equal to the fuel rod heat generation value to simulate the fuel rod thermal properties. When these values are so adjusted the reactor operator can determine the coolant temperature by reading the reference temperature sensor or detector, the maximum rod temperature in either a steady state or a transient condition and by comparing the two resistance temperature detectors, the operator can determine the cooling properties of the coolant present at the sensor head. By the distribution of sensors throughout the reactor vessel in the string as described, the operator is given a full disclosure of the condition of temperatures and coolant properties throughout the reactor vessel.

The sensors of the present invention will use a ceramic core, platinum, or other suitable resistance wire, Sourisen or ceramic potting material, stainless steel casings and magnesium oxide insulation in the flexible wire leads in order to provide dependable and safe operation in the high temperature and pressure environment present in the reactor vessel.

Sensors of the type similar to those described have been tested for use in the nuclear reactor vessel. Sensors of only 1 cm (0.4 in) in outside diameter were built since the inside diameter of many instrument guide tube is 1 cm (0.4 in). The sensor was operated in saturated steam and the output voltages obtained after the probe reached steady-stated. When the probe was immersed in saturated liquid, the steady state output voltages were less than −5 mV. The table which follows shows the output readings obtained for immersion in liquid and vapor at varying temperatures and pressures:

| Ambient T (°C.) | Conditions P (MPa) | Medium | | Sensor Head output (mV) |
| --- | --- | --- | --- | --- |
| | | Liquid | Vapor | |
| 101 | .2 | X | | −6.1 |
| 99 | .1 | | X | 56.0 |
| 154 | .4 | X | | −6.3 |
| 143 | .4 | | X | 54.0 |
| 190 | 1.2 | X | | −6.0 |
| 186 | 1.1 | | X | 50.6 |
| 273 | 5.5 | X | | −7.3 |
| 266 | 4.8 | | X | 36.3 |
| 314 | 10.1 | X | | −8.0 |
| 305 | 8.6 | | X | 22.5 |

These tests show the ability of the sensors to read the liquid or vapor atmosphere present.

While the description of the invention relates to the use of the sensor strings in a nuclear reactor vessel, it is obvious that the sensor string can be utilized in a vessel containing any sort of liquid for other purposes. Thus, it is requested that the scope of the invention be limited only by the scope of the following appended claims.

I claim:

1. A system for sensing fluid level and properties in a vessel comprising a plurality of spaced resistance temperature detector sensor assemblies, each sensor assembly comprising a first and second temperature sensor, a heater adjacent one temperature sensor and isolated from the second temperature sensor, means for detecting differential heat responses between the temperature sensors, means to measure differential heat responses between the temperature sensors and means to sense individual temperatures of the two temperature sensors of each sensor assembly.

2. The system of claim 1 wherein the plurality of sensor assemblies are connected by flexible tubing and connectors adapted to allow the free flow of fluid past the temperature sensors.

3. The system of claim 2 wherein the sensor assemblies comprise a stiffening bar and means to prevent bending of the sensor elements.

4. The system of claim 2 wherein the connectors comprise concave surfaced connecting guides.

5. A system for sensing coolant level and properties in a nuclear reactor vessel comprising a plurality of spaced resistance temperature detector sensor assemblies, each sensor assembly comprising a first and second temperature sensor, a heater adjacent one temperature sensor, means for detecting differential heat responses between the temperature sensors, means to measure differential heat responses between the temperature sensors, and means to individually sense sensor temperatures, flexible tubing and connectors adapted to allow the free flow of coolant past the, sensor assemblies to connect together the plurality of sensor assemblies.

6. The system of claim 5 wherein the sensor assemblies comprise a stiffening bar and means to prevent bending of the temperature sensor elements.

7. The device of claim 5 wherein the sensor assemblies are adapted to have a thermal dispersion rate and a unit area heat transfer rate which simulate nuclear reactor fuel rod heat generation values which allows instantaneous real time sensing of corrective action taken.

* * * * *